(12) United States Patent
Martino

(10) Patent No.: US 8,496,429 B2
(45) Date of Patent: Jul. 30, 2013

(54) PRIME MOVER

(76) Inventor: Dominick Daniel Martino, Levittown, PA (US)

( * ) Notice: Subject to any disclaimer, the term of this patent is extended or adjusted under 35 U.S.C. 154(b) by 0 days.

(21) Appl. No.: 13/141,724

(22) PCT Filed: Dec. 23, 2009

(86) PCT No.: PCT/US2009/069416
§ 371 (c)(1),
(2), (4) Date: Aug. 11, 2011

(87) PCT Pub. No.: WO2010/075515
PCT Pub. Date: Jul. 1, 2010

(65) Prior Publication Data
US 2012/0139252 A1   Jun. 7, 2012

Related U.S. Application Data

(60) Provisional application No. 61/140,710, filed on Dec. 24, 2008.

(51) Int. Cl.
*F03D 7/00* (2006.01)
(52) U.S. Cl.
USPC ............... 415/4.4; 416/93 R; 416/197 A
(58) Field of Classification Search
USPC ............. 415/4.2, 4.4; 416/90 A, 93 R, 91, 416/197 R, 197 A, 210 R, 232
See application file for complete search history.

(56) References Cited

U.S. PATENT DOCUMENTS

| | | | |
|---|---|---|---|
| 4,162,410 A | 7/1979 | Amick | |
| 5,656,865 A | 8/1997 | Evans | |
| 6,448,668 B1 | 9/2002 | Robitaille | |
| 6,786,697 B2 | 9/2004 | O'Connor et al. | |
| 6,809,432 B1 | 10/2004 | Bilgen | |
| 6,849,964 B2 | 2/2005 | Becherucci et al. | |
| 2007/0296219 A1 | 12/2007 | Nica | |

FOREIGN PATENT DOCUMENTS

| | | |
|---|---|---|
| GB | 2116640 | 9/1983 |
| WO | WO 2009/047679 | 4/2009 |

OTHER PUBLICATIONS

International Patent Application No. PCT/US2009/069416: International Search Report and Written Opinion dated Mar. 11, 2010, 10 pages.

*Primary Examiner* — Dwayne J White
(74) *Attorney, Agent, or Firm* — Woodcock Washburn LLP

(57) ABSTRACT

A prime mover that is powered by the energy of a fluid is provided. Such a prime mover may include a first fairing, a second fairing spaced apart from the first fairing to define a gap therebetween and a blade assembly mounted on a shaft that extends between the first and second fairings. The first and second fairings each have a curved peripheral edge for guiding a fluid into the gap at an increased velocity. When the fluid flows into the gap it contacts the blade assembly to thereby rotate the blade assembly about an axis that is defined by the shaft. The rotation of the blade assembly may be used to generate power in a power generator. The prime mover may be mounted on a cell phone tower and used to generate electricity for powering components of the tower and/or for providing electricity to the power grid.

28 Claims, 19 Drawing Sheets

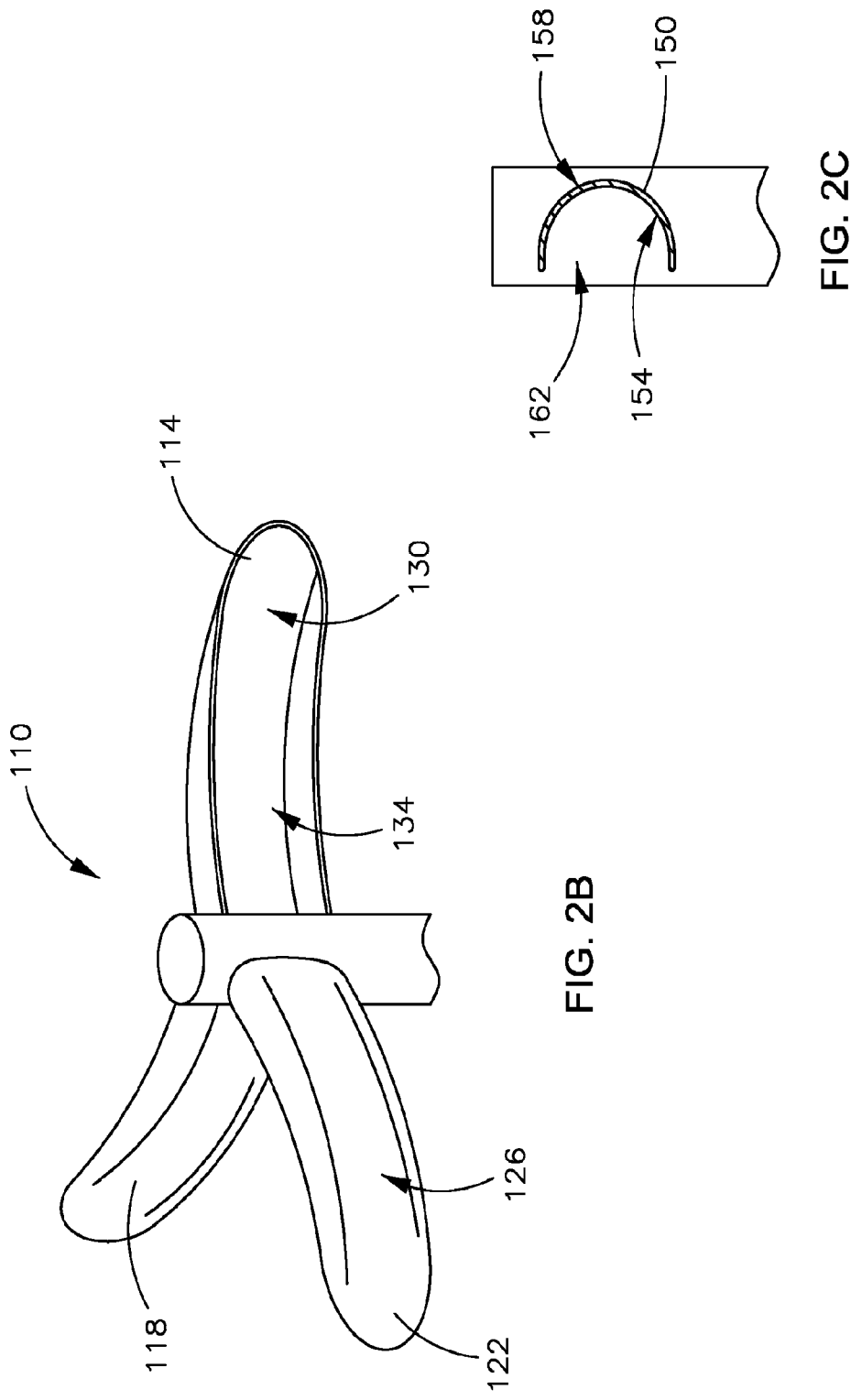

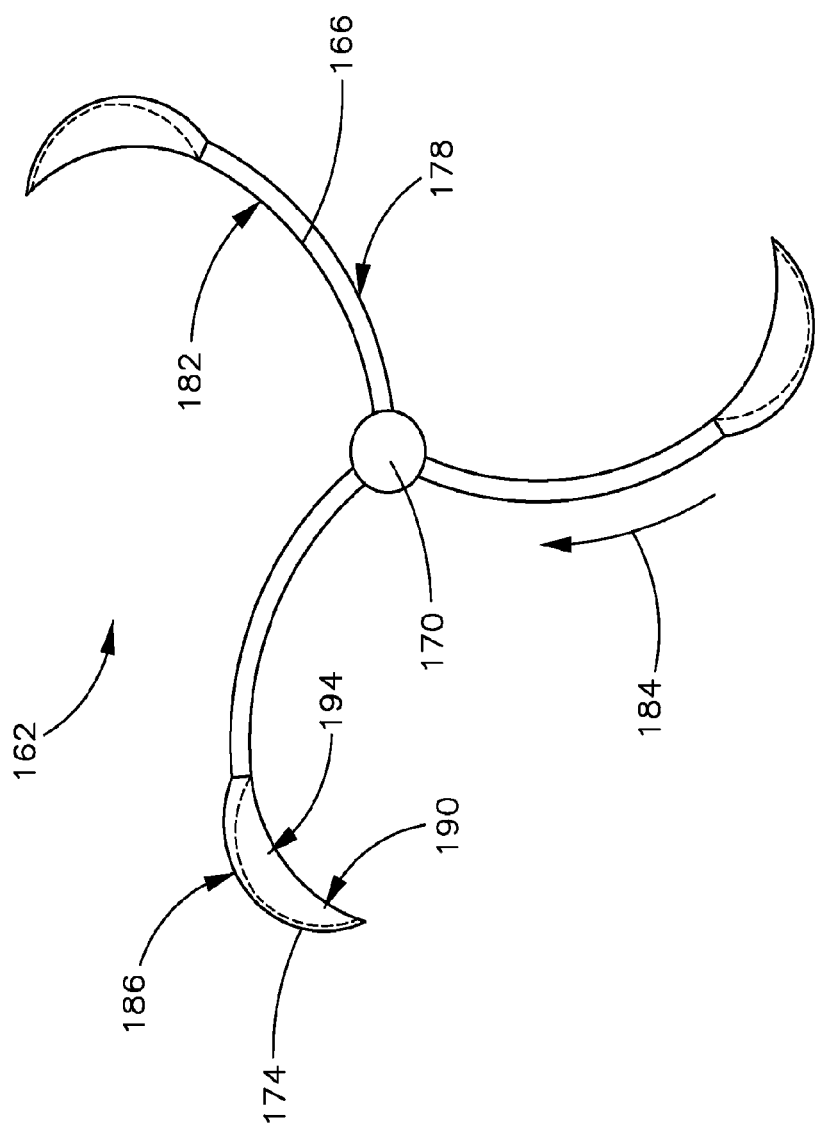

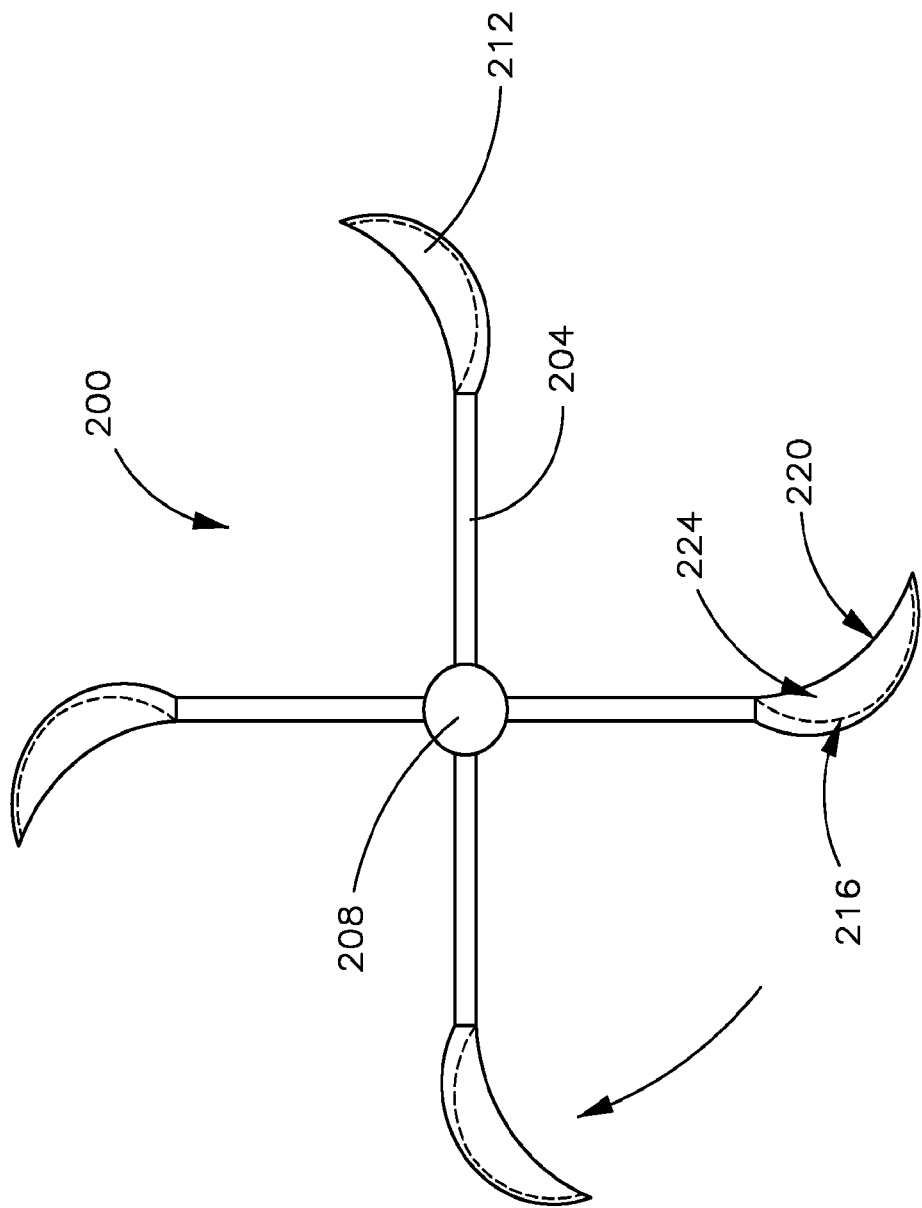

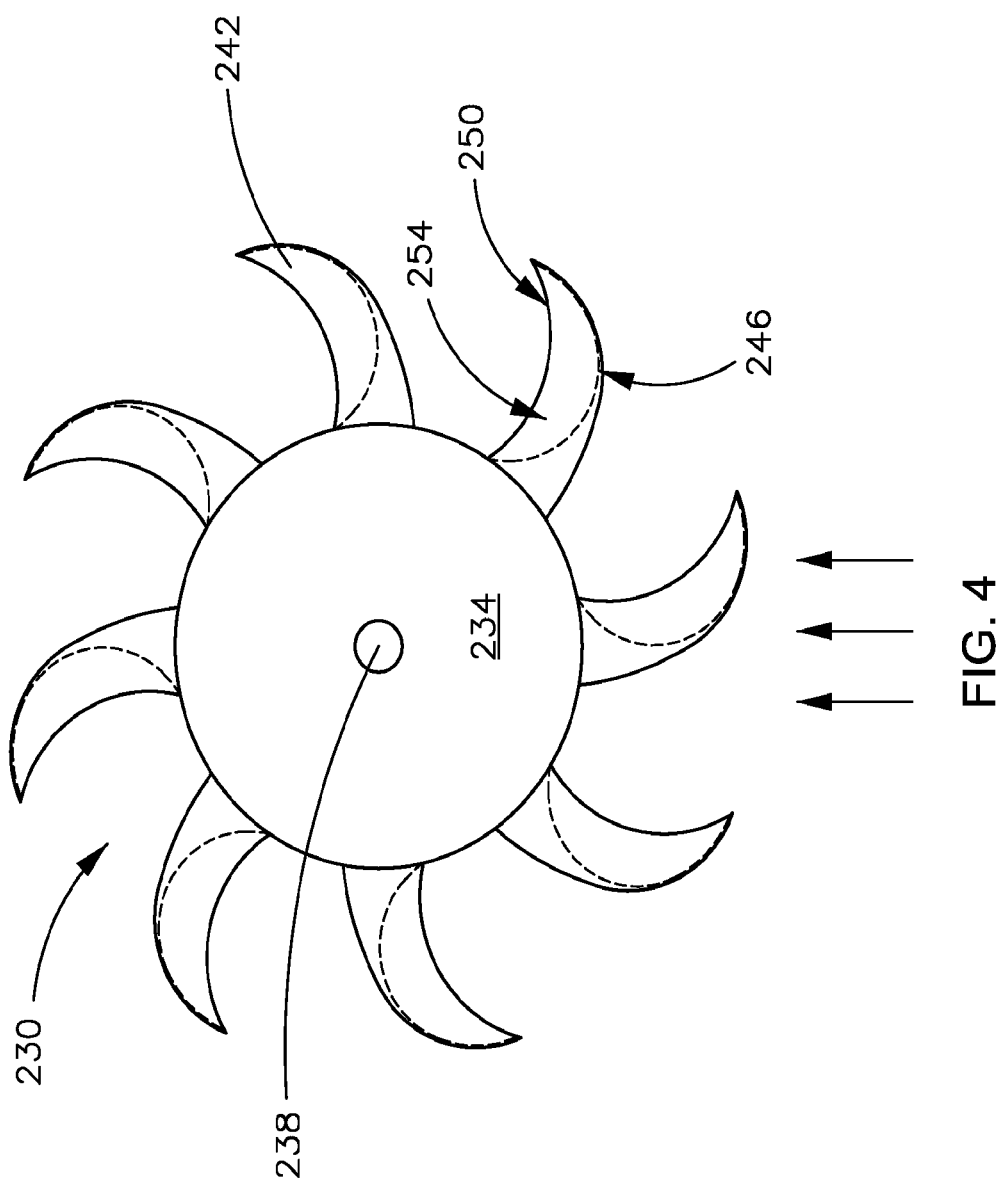

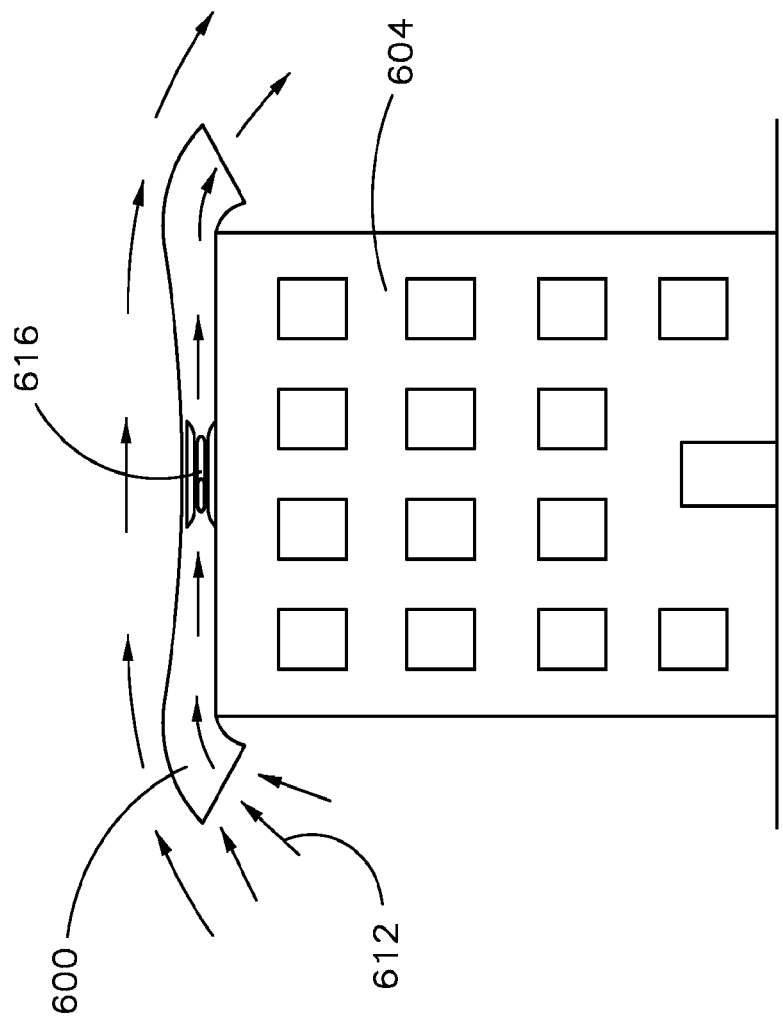

PRIME MOVER

CROSS-REFERENCE TO RELATED APPLICATIONS

This application is the National Stage of International Application No. PCT/US2009/069416, filed Dec. 23, 2009, which claims the benefit of U.S. Provisional Application No. 61/140,710, filed Dec. 24, 2008, the disclosures of which are incorporated herein by reference in their entirety for any and all purposes.

TECHNICAL FIELD

The present invention relates generally to a prime mover and methods of use. More particularly, the invention relates to an apparatus and method for generating power derived from fluid flow.

BACKGROUND

For years, rotating blades have been used for converting wind and/or water energy into other forms of energy needed to accomplish useful work. For example, classic windmills and wind turbines employ propeller surfaces to engage a wind stream and convert the energy in the wind stream into rotation of a horizontal windmill shaft. These classic windmills, however, have many shortcomings. For example, the propellers or blades of classic windmills are typically facing one direction. If the wind is not blowing in the direction of the propellers, the windmill is not working, and wind energy is not being converted into other forms of energy as desired. Furthermore, regardless of whether optimal wind directionality is achieved, horizontal axis windmills cannot exploit high energy, high velocity winds because such winds can overload the moving blades causing damage or failure. It is necessary to shut down conventional horizontal windmills at wind speeds in excess of 35 mph to avoid these problems. Wind energy increases as the cube of velocity; the cessation of blade operation during high-velocity winds represents a serious disadvantage because this is when the most wind energy is available for conversion.

Vertical axis wind turbines are also available. Although vertical axis turbines address many of the shortcomings of horizontal shaft windmills, they have their own inherent problems. For example, some prior art devices change airflow to the blade areas in undesirable ways, such as the device shown in International Publication No. WO2009/047679. There, fluid is sucked in through a hollow center of the device's fluid deflectors. A large gap is required between the fluid deflectors in order for the device to operate properly. In particular, the device needs the large gap for a favorable vortex formation, to rotate the blades. Accordingly, such a device may be inefficient, and have a large undesirable height.

Accordingly, an improved prime mover that is efficient and practical is needed.

SUMMARY

A prime mover that is powered by the energy of a fluid is provided. Such a prime mover may include a first fairing, a second fairing spaced apart from the first fairing to define a gap therebetween, and a blade assembly mounted on a shaft that extends between the first and second fairings. A height of at least one of the fairings is at least 15% of the height of the gap that is defined between the fairings. The first and second fairings each have a curved peripheral edge for guiding a fluid into the gap. When the fluid flows into the gap it contacts the blade assembly to thereby rotate the blade assembly about a vertical axis that is defined by the shaft. In some embodiments, the peripheral edge of each fairing transitions into a substantially flat continuous surface.

Electricity may be generated from a prime mover that is mounted on a tower that is configured to transmit signals. The prime mover may include a first fairing and a second fairing spaced apart from the first fairing. A blade assembly may be disposed between the first and second fairings and may be configured to rotate about a vertical axis when the blade assembly is contacted by a fluid. Energy may be generated from the rotating blade assembly and stored in a generator. The stored energy may then be delivered to a power grid.

BRIEF DESCRIPTION OF THE DRAWINGS

FIG. 2B is an isometric view of another example embodiment of a blade assembly to be used with a prime mover in accordance with the present invention.

FIG. 2C is a cross-section of a blade that forms part of a blade assembly.

FIG. 3A is a top view of another example embodiment of a blade assembly to be used with a prime mover in accordance with the present invention.

FIG. 3B is a top view of another example embodiment of a blade assembly to be used with a prime mover in accordance with the present invention.

FIG. 4 is a top view of another example embodiment of a blade assembly to be used with a prime mover in accordance with the present invention.

FIG. 10A is a schematic depicting a flow guide for guiding higher speed laminar airflow found just off the top edge of a building.

DETAILED DESCRIPTION OF ILLUSTRATIVE EMBODIMENTS

Preferred structures and methods for generating power are described herein. Embodiments of a prime mover that employ this technology are also described. The present invention is not limited to the disclosed configurations and uses of the prime movers, but rather encompasses use of the technology disclosed in any power generation application according to the language of the claims.

Figure 1A:
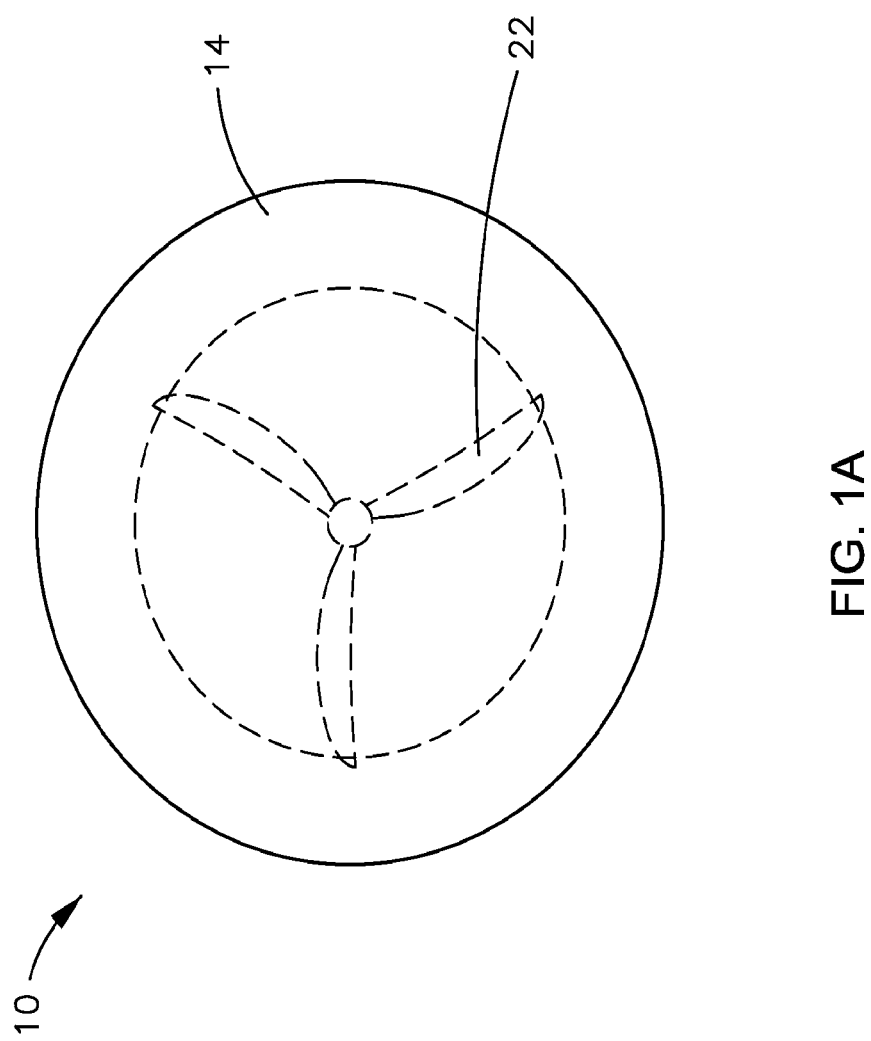
FIG. 1A is a top view of an example embodiment of a prime mover.
Figure 1B:
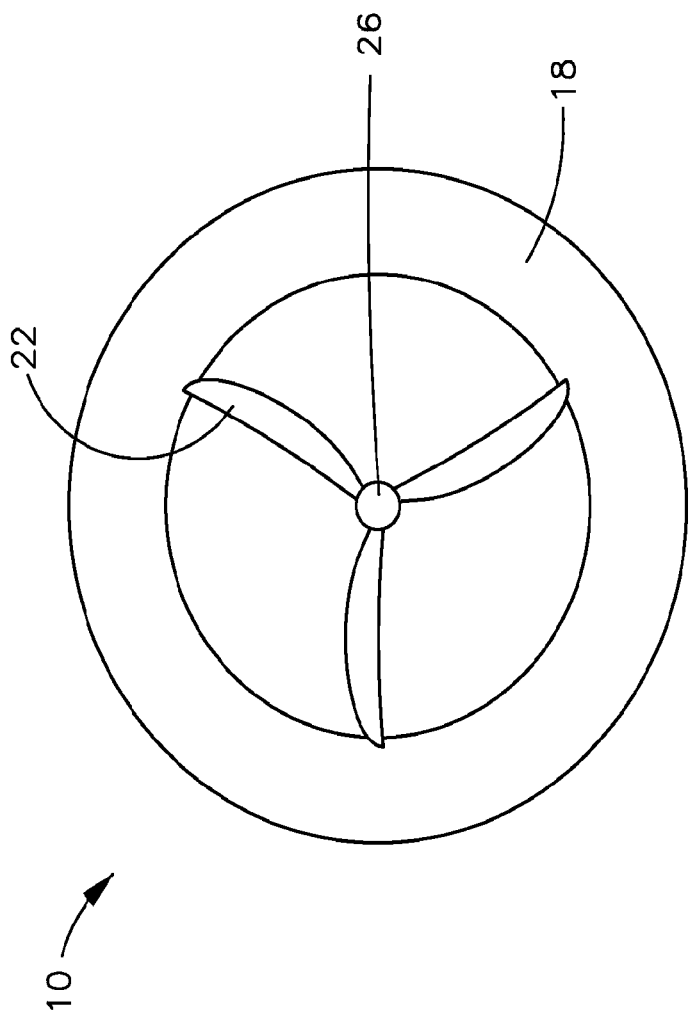
FIG. 1B is a top view of the prime mover shown in FIG. 1A with a top fairing removed for clarity.
Figure 1C:
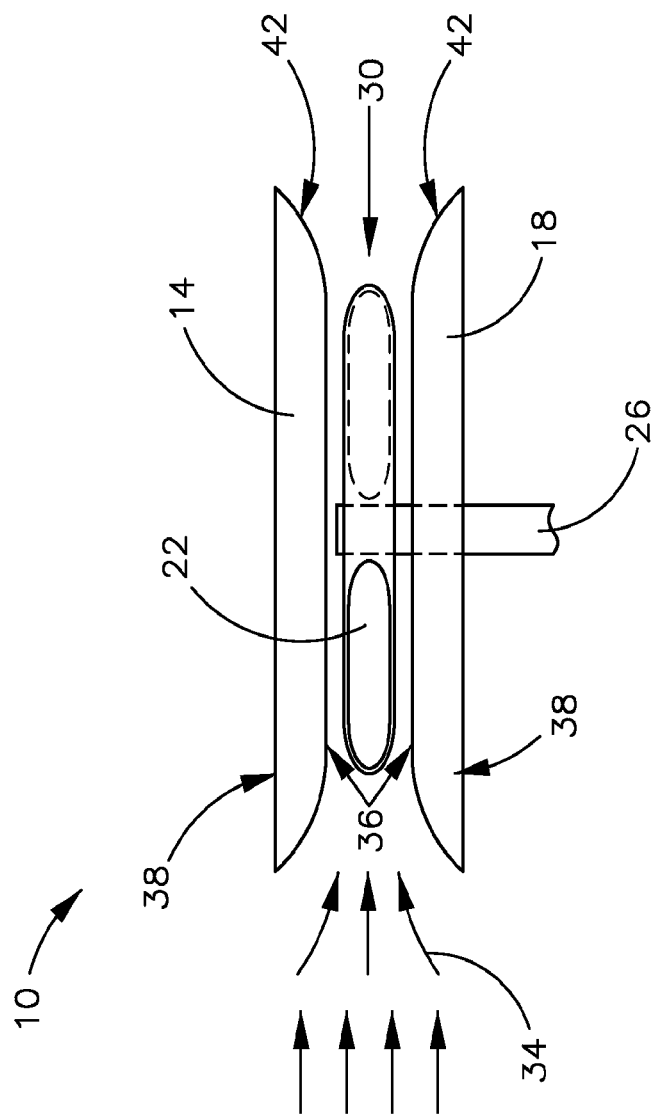
FIG. 1C is a side view of the prime mover shown in FIG. 1A.

FIGS. 1A, 1B and 1C depict an example prime mover. As shown, a prime mover 10 may include a first fairing 14, a second fairing 18, and a blade assembly 22 mounted on a shaft 26. As shown in FIG. 1C, first fairing 14 is spaced apart from second fairing 18 such that a gap 30 is formed between the two fairings. Gap 30 should be large enough such that blade assembly 22 can freely rotate on shaft 26 between first and second fairings 14 and 18. As shown in FIG. 1C, a fluid 34 may flow between first and second fairings 14 and 18, into gap 30 and may contact blade assembly 22 to thereby rotate blade assembly 22. Fluid 34 may be any fluid, such as air or water, for example. It should be understood that fairings 14 and 18, and blade assembly 22 may be connected together to rotate as a single unit as opposed to the embodiment shown where only blade assembly 22 rotates.

As shown in FIGS. 1A, 1B and 1C, fairings 14 and 18 are each oriented in a horizontal plane and have an internal surface 36, an external surface 38, and a peripheral surface 42. As shown in FIGS. 1A and 1B, fairings 14 and 18 preferably are circular in shape. Furthermore, either fairing 14 or 18 or both preferably has a height that is at least 15% of the height of the gap 30 between the fairings 14 and 18, more preferably at least 20% and even more preferably 30%. The larger heights of the fairings further increase the fluid flow velocity to the blade area. By having fairings that are circular and oriented in a horizontal plane, prime mover 10 may be omni-directional. That is, prime mover 10 may be capable of operating regardless of what direction fluid 34 is flowing. It should be understood, however, that fairings 14 and 18 are not limited to having a circular shape and may have other shapes.

As shown in FIGS. 1A, 1B and 1C, the internal surfaces 36 of fairings 14 and 18 are continuous and each have a diameter that is less than the diameters of their respective external surfaces 38. It should be understood that the term continuous means substantially uninterrupted by holes. The continuous internal surfaces help produce the desired Venturi effect. Additionally, fairings 14 and 18 are positioned such that the internal surface 36 of fairing 14 is opposing internal surface 36 of fairing 18. Because of the difference in diameters between internal surfaces 36 and external surfaces 38, in conjunction with the heights of the internal surfaces 36 and the external surfaces 38, and because of the positioning of fairings 14 and 18 relative to each other, peripheral surfaces 42 will guide fluid 34 toward blade assembly 22 as shown in FIG. 1C. Preferably, peripheral surfaces 42 are Bernoulli shaped, curving inward toward gap 30. That is, peripheral surfaces 42 should each have a circular arc or be parabolic in shape. By having curved peripheral surfaces 42, flowing fluid 34 will not only be guided toward gap 30 and therefore toward blade assembly 22, but will also increase in speed as it enters gap 30. Therefore, prime mover 10 is capable of operating in an environment where fluid 34 flows at slower speeds and can transform energy at a faster rate at all speeds.

For example, the power available in the wind is given by the following equation:

$$P = \tfrac{1}{2} C_p \times \rho \times A \times V^3 \quad \text{Equation 1—Wind Power Equation}$$

Where,
P=power available in the wind measured in watts
Cp=blade efficiency
A=area in square meters swept by the blades
ρ=air density
v=wind velocity It is not possible to change the speed at which the wind blows; however, one can increase the speed of the wind that the blades receive. This is done through the use of fairings 14 and 18 that create a type of Venturi effect whereby the cross sectional area of an external fluid flow field is substantially reduced in the gap 30 between the fairings 14 and 18 to thereby substantially increase the velocity between the fairings 14 and 18. The velocity increase of a typical Venturi tube is given by the following equation:

$$A_1 V_1 = A_2 V_2 \quad \text{Equation 2: Venturi tube equation}$$

Where $A_1$ is the area of the fluid flow field entering the Venturi tube and $A_2$ is the cross sectional area of the smallest part of the inside of the tube. $V_1$ is the external fluid flow velocity while $V_2$ is the internal fluid flow velocity.

From the equation it can be seen that as the ratio of the external fluid flow area to the internal fluid flow area increases so does the fluid flow velocity inside the tube. The fairings 14 and 18 operate similarly (but to a lesser degree) except that, unlike the Venturi tube, fluid can enter and be utilized from any azimuth direction. The cross sectional area of the entering fluid flow is traded-off to increase the velocity of the fluid hitting the prime mover blade assembly 22 internally. The fairings 14 and 18 may therefore increase the fluid velocity to the blade assembly 22 such that the lower blade efficiency of vertical axis wind turbines is overcome to utilize their advantages and obtain increased power outputs, and may also allow multiple prime movers to be stacked one on top of another to multiply power and enable implementations on communications towers.

As shown in FIG. 1C, shaft 26 extends at least partially between fairings 14 and 18. As shown in FIGS. 1A, 1B and 1C, shaft 26 and blade assembly 22 which is mounted on shaft 26 are proximate to the center of fairings 14 and 18. It shall be understood that while shaft 26 is shown as extending partially between fairings 14 and 18, it may extend completely between fairings 14 and 18.

FIGS. 2A, 2B, 2C, 3A, 3B, 4, 5A, 5B, 6A and 6B depict several different configurations of blade assembly 22. Each blade assembly preferably rotates about a vertical axis but is not limited to such an orientation. Further, while several configurations are depicted, prime mover 10 is not limited to the embodiments disclosed, and may include other blade assemblies that incorporate the advantages of the blade assemblies shown in the figures.

Figure 2A:
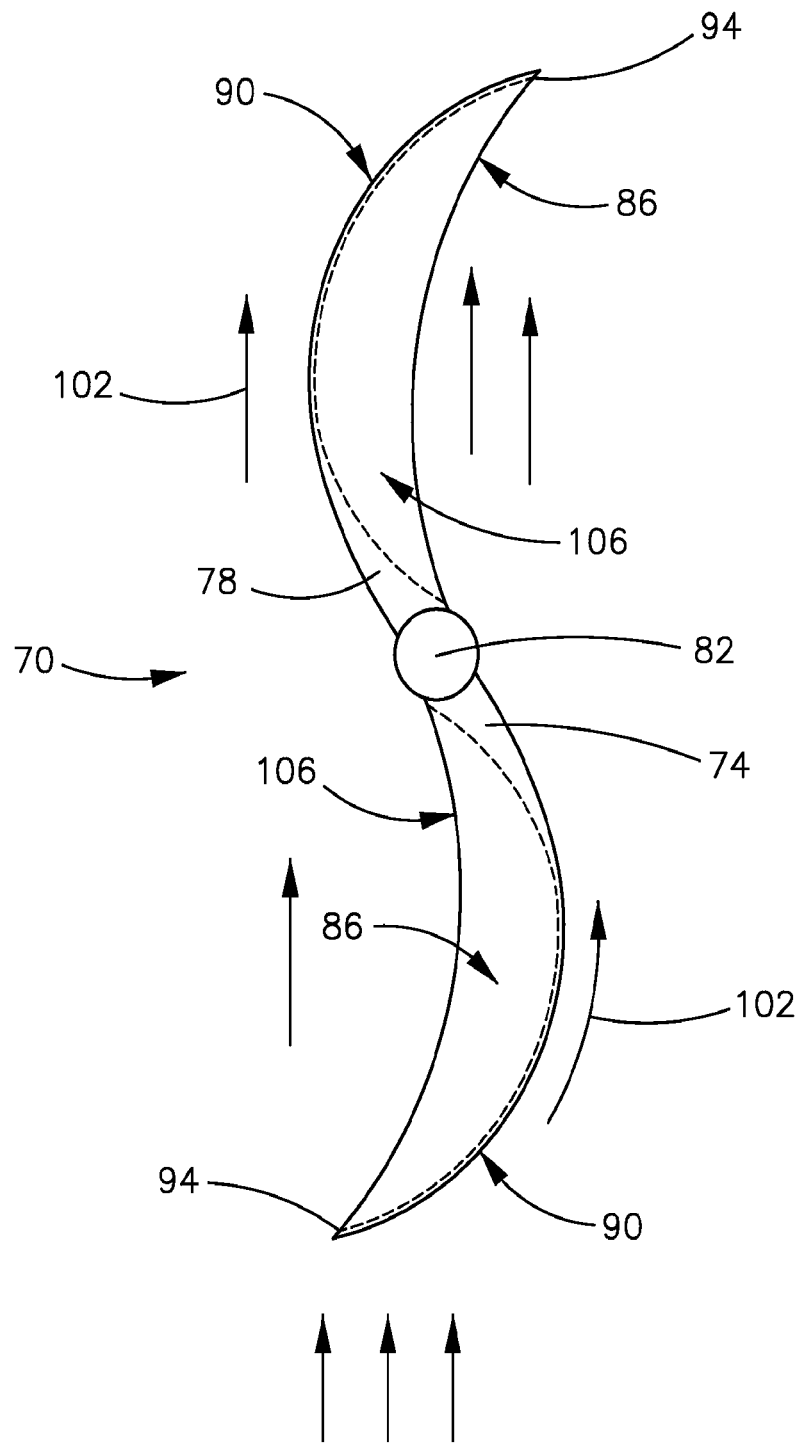
FIG. 2A is a top view of an example embodiment of a blade assembly to be used with a prime mover in accordance with the present invention.

In that regard, FIG. 2A depicts an example embodiment of a blade assembly 70 to be used in a prime mover, such as for example in prime mover 10. As shown, blade assembly 70 includes a first blade 74 and a second blade 78. Each blade 74 and 78 is mounted on a shaft 82, and includes a front face 86 and a back face 90. As shown in FIG. 2A, each blade 74 and 78 is curved such that front faces 86 are concave and back faces 90 are convex. That is, front faces 86 curve in as they extend from a respective tip 94 toward shaft 82 and back faces 90 curve out as they extend from a respective tip 94 toward shaft 82. Because blades 74 and 78 are curved, as a fluid 102 flows along the convex back faces 90 of the blades, a horizontal component of fluid 102 tends to pull the blades into the incoming fluid during the blades' return path.

As shown in FIG. 2A, front faces 86 each define a cavity 106 for catching an incoming fluid such as for example wind.

As the fluid flows, cavities 106 will catch the fluid and thereby rotate blade assembly 70. Therefore, because of the shape and features of blades 74 and 78, each blade 74 and 78 is capable of being pushed and pulled by the flowing fluid depending on where in the rotation blade assembly 70 is located.

As shown in FIG. 2A, one tip 94 curves into the flowing fluid while the other tip 94 curves away from the flowing fluid. Such a feature helps rotate the blade assembly 70. In that regard, tips 94 of blade assembly 70 take advantage of leverage to thereby obtain maximum power from the flowing fluid.

FIG. 2B depicts a similar blade assembly as shown in FIG. 2A, but includes three blades as opposed to two. As shown, a blade assembly 110 includes a first blade 114, a second blade 118 and a third blade 122. Each blade 114, 118 and 122 includes a convex back face 126 and a concave front face 130 that defines a cavity 134. Front faces 130, back faces 126 and cavities 134 are similar to those described for blade assembly 70 and thus operate in a similar manner and provide the same advantages over conventional blades.

FIG. 2C is a partial cross-sectional view depicting a cross section of a blade that may form part of a blade assembly, such as for example blade assembly 22 or blade assembly 70. As shown, a blade 150 has a front face 154 and a back face 158. Front face 154 defines a cavity 162 and back face 158 is shaped to deflect a fluid as blade 150 cuts through the fluid. While back face 158 is shown as being rounded, it should be appreciated that back face 158 may have other configurations for cutting through a fluid. For example, back face 158 may have a curved shape.

FIGS. 3A and 3B depict two more embodiments of a blade assembly that may be used in a prime mover, such as for example in prime mover 10. The blade assemblies depicted in FIGS. 3A and 3B each include a smaller blade that is attached to an arm. Such a configuration may be more economical and may focus the power of a flowing fluid where the blade assemblies have the most leverage.

As shown in FIG. 3A, a blade assembly 162 includes three arms 166 attached to a shaft 170, wherein each arm 166 has a blade 174 extending from a distal end thereof. Because blades 174 extend from a distal end of arms 166, the power of a flowing fluid will be focused at a point where blade assembly 162 has the most leverage.

As shown in FIG. 3A, each arm 166 is curved having a convex backside 178 and a concave front side 182. By having this particular configuration, a fluid 184 flowing along arms 166 may help pull arms 166 into the fluid during the arms' return. Similarly, blades 174 have a convex back face 186 and a concave front face 190 that defines a cavity 194. Back faces 186, front faces 190 and cavities 194 are similar to those described for blade assembly 70 and thus operate in a similar manner and provide the same advantages over conventional blades.

FIG. 3B. depicts a similar blade assembly as blade assembly 162 shown in FIG. 3A except that the blade assembly shown in FIG. 3B has four arms and blades as opposed to three, and the arms are straight as opposed to curved. As shown, a blade assembly 200 includes four arms 204 attached to a shaft 208, wherein each arm 204 has a blade 212 extending from a distal end thereof. Because blades 212 extend from a distal end of arms 204, the power of a flowing fluid will be focused at a point where blade assembly 200 has the most leverage. Blades 212 have a convex back face 216 and a concave front face 220 that defines a cavity 224. Back faces 216, front faces 220 and cavities 224 are similar to those described for blade assembly 70 and thus operate in a similar manner and provide the same advantages over conventional blades.

FIG. 4 depicts another embodiment of a blade assembly that may be used in a prime mover, such as for example in prime mover 10. As shown, a blade assembly 230 includes a flywheel 234 mounted on a shaft 238, and several blades 242 extending from a periphery of flywheel 234. As shown, each blade 242 has a convex back face 246 and a concave front face 250 that defines a cavity 254. Back faces 246, front faces 250 and cavities 254 are similar to those described for blade assembly 70 and thus operate in a similar manner and provide the same advantages over conventional blades.

Figure 5B:
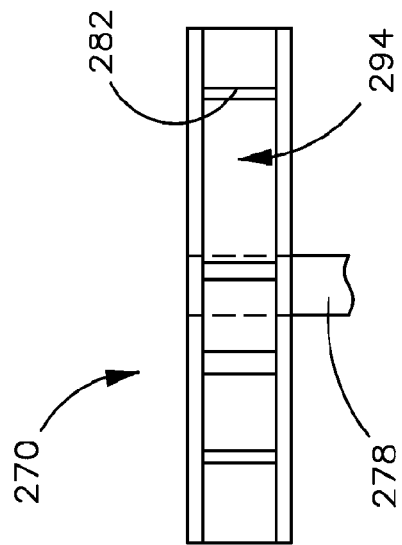
FIG. 5B is a side view of the blade assembly shown in FIG. 5A.
Figure 5A:
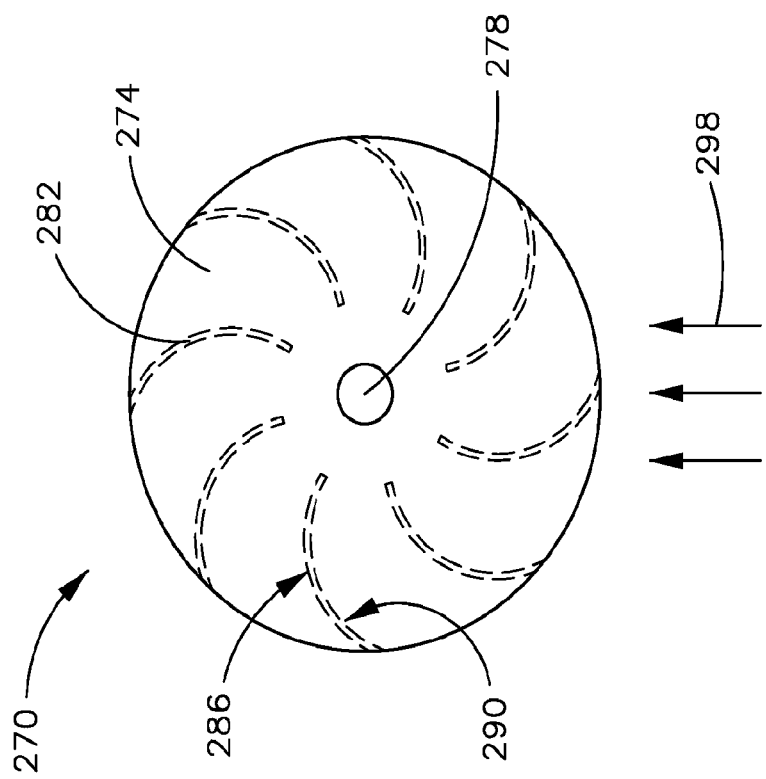
FIG. 5A is a top view of another example embodiment of a blade assembly to be used with a prime mover in accordance with the present invention.

FIGS. 5A and 5B depict another embodiment of a blade assembly that may be used in a prime mover, such as for example in prime mover 10. The blade assembly shown in FIGS. 5A and 5B is similar to the one shown in FIG. 4 except that the blades are incorporated within the flywheel. In that regard, a blade assembly 270 includes a flywheel 274 mounted on a shaft 278 and several airfoils 282 incorporated into flywheel 274. As shown in FIG. 5A, each airfoil 282 includes a convex back face 286 and a concave front face 290. As shown in FIG. 5B, each front face 290 along with portions of flywheel 274 define a cavity 294 for catching a fluid 298.

Figure 6A:
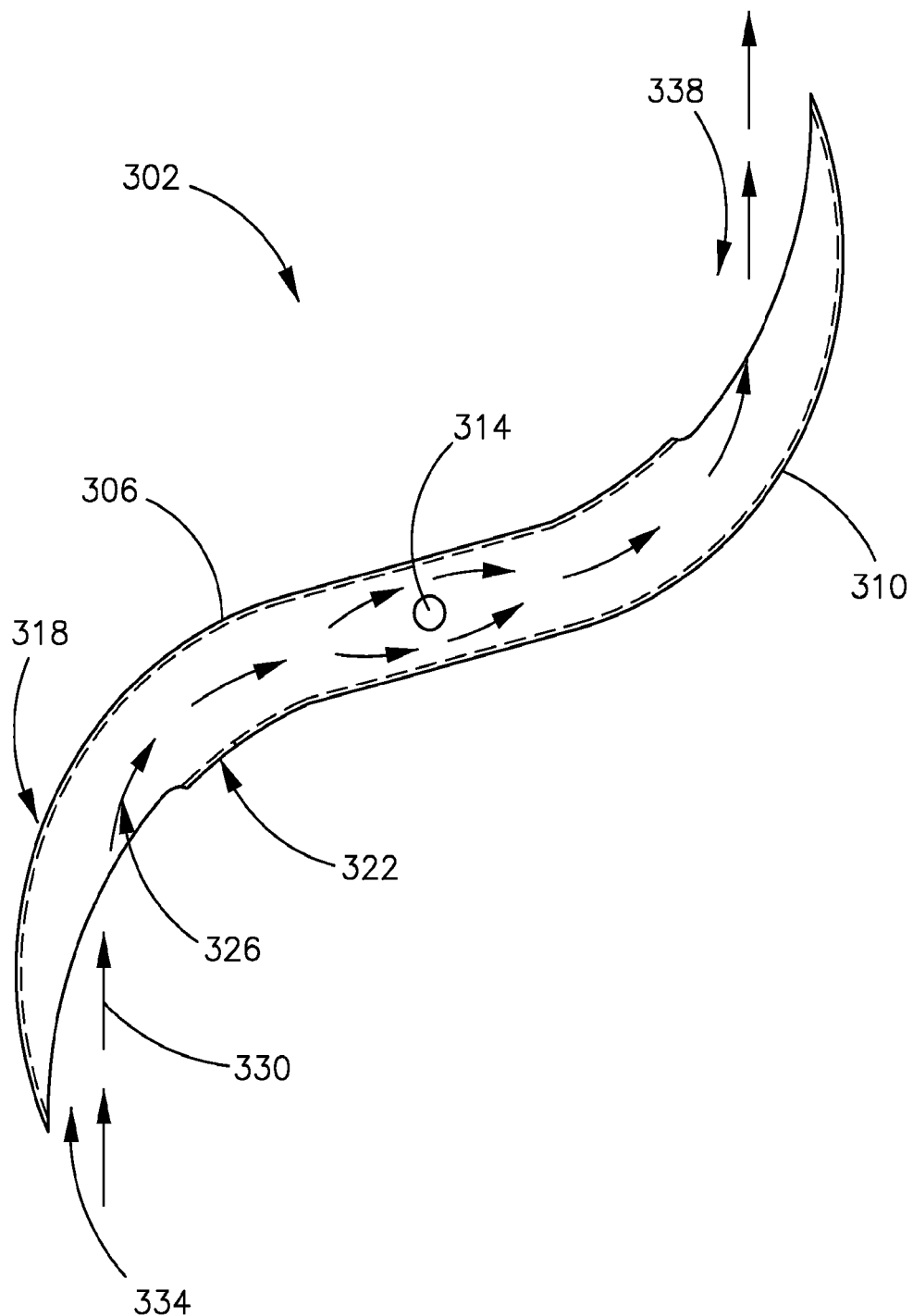
FIG. 6A is a top view of another example embodiment of a blade assembly to be used with a prime mover in accordance with the present invention.
Figure 6B:
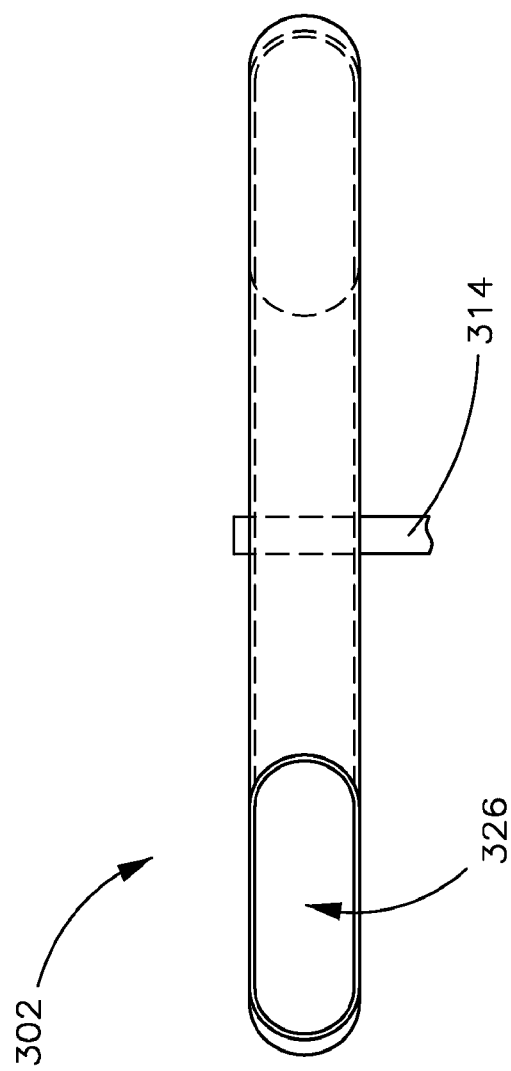
FIG. 6B is a side view of the blade assembly shown in FIG. 6A.

FIGS. 6A and 6B depict another embodiment of a blade assembly that may be used in a prime mover, such as for example in prime mover 10. The blade assembly shown in FIGS. 6A and 6B is hollow to allow a fluid to flow through the blades. As shown, a blade assembly 302 includes a first blade 306 and a second blade 310 interconnected with the first blade 306. The interconnected blades are mounted on a shaft 314. Each blade 306 and 310 includes a convex back face 318 and a concave front face 322 that defines a cavity 326. As shown in FIGS. 6A and 6B, cavities 326 are also connected to allow a flowing fluid 330 to pass therethrough. By allowing fluid 330 to pass through, torque may be added to the rotating blade assembly and a decrease in pressure buildup in undesired locations may result. For example, flowing fluid 330 may take the force from the momentum change of the fluid flow at both an inlet 334 and an outlet 338 of the interconnected blades 306 and 310. These momentum changes may produce desirable force components (i.e. pushes the blade at the inlet and propels the blade at the outlet). Back faces 318 and front faces 322 are similar to those described for blade assembly 70 and thus operate in a similar manner and provide the same advantages over conventional blades.

Figure 7A:
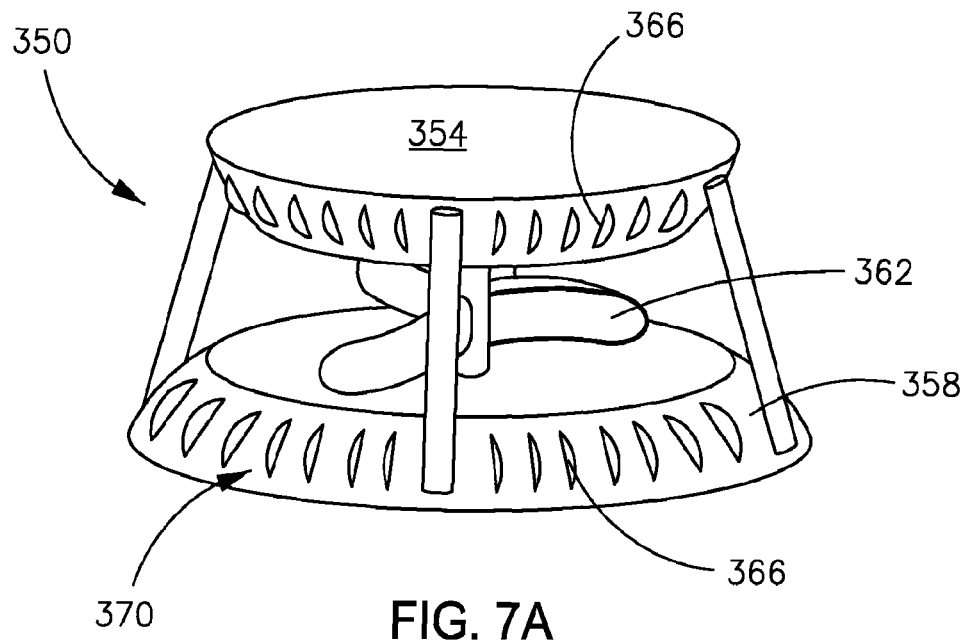
FIG. 7A is an isometric view depicting a prime mover having asymmetrically sized fairings.
Figure 7B:
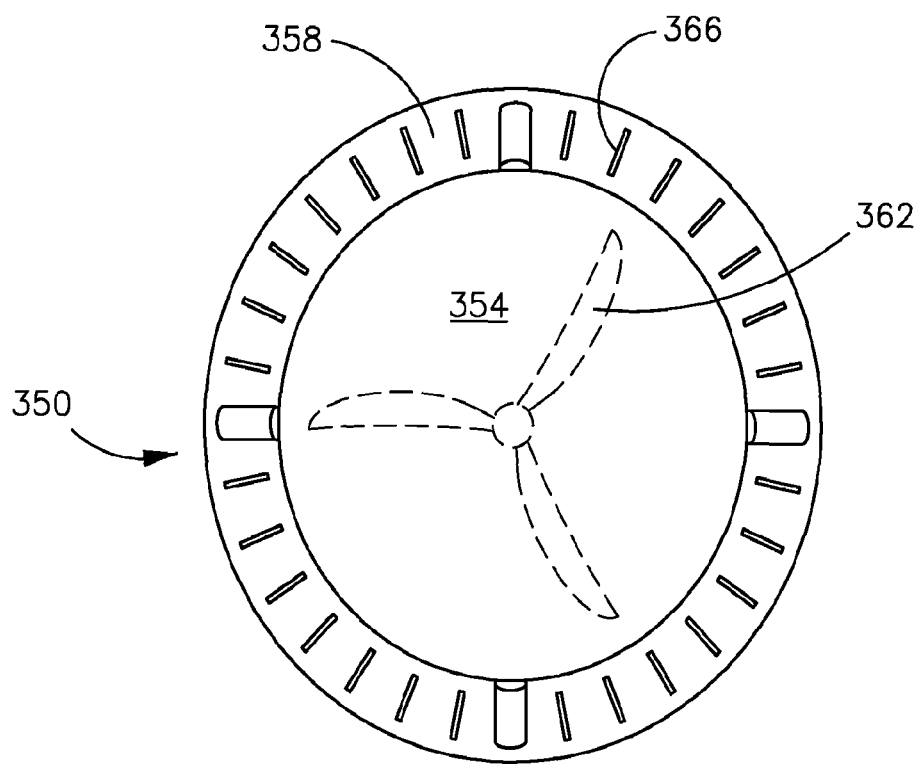
FIG. 7B is a top view of the prime mover shown in FIG. 7A.

FIGS. 7A and 7B depict a prime mover having asymmetrically sized fairings to allow wider angles for a fluid to enter. As shown, a prime mover 350 may include a first fairing 354, a second fairing 358 and a blade assembly 362 positioned between the first and second fairings. As shown, first fairing 354 may be sized smaller than second fairing 358. Therefore if a fluid were to flow from above, the fluid would still be guided toward blade assembly 362 because it would not be obstructed by the fairing. While prime mover 350 is shown as having a top fairing that is smaller, it should be understood that the bottom fairing could be smaller than the top fairing.

As shown in FIGS. 7A and 7B, a prime mover may also include protruding guide vanes. As shown, fairings 354 and 358 each include protruding guide vanes 366 for guiding the flowing fluid toward blade assembly 362. Preferably, guide vanes 366 are disposed on a peripheral surface 370 of each fairing 354 and 358. Though not shown, guide vanes 366 may pivot to orient themselves with the direction of fluid flow peripheral surface 370 either manually or automatically.

Figure 8:
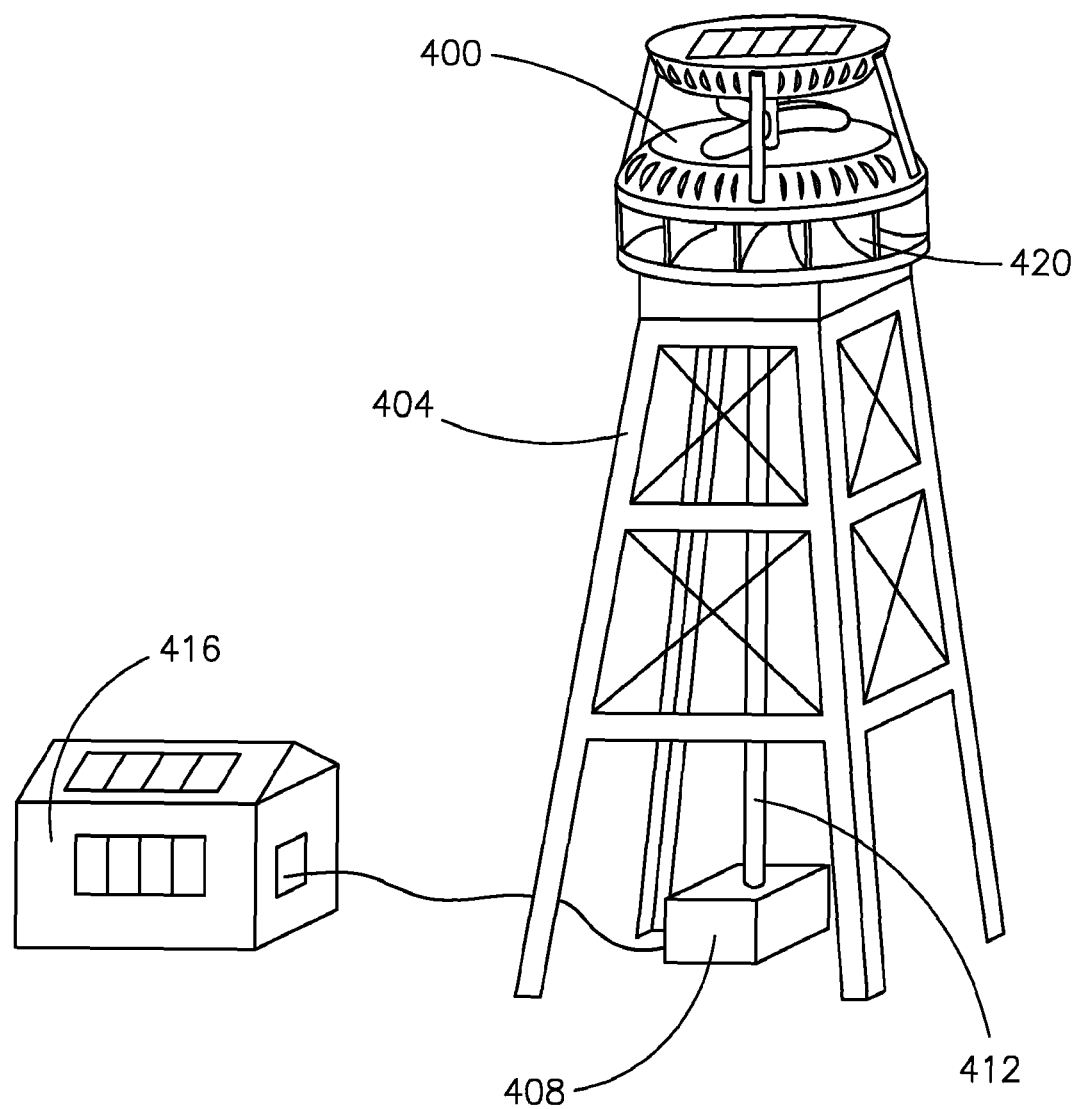
FIG. 8 is a schematic depicting a prime mover mounted on a tower.

Prime movers according to the invention may be placed on a variety of structures that may not have been practical for conventional wind mills. For example, as shown in FIG. 8 a prime mover 400 may be placed on top of a tower 404. Tower 404 may be any type of tower including a tower for transmitting signals such as a cell phone tower. Because prime mover 400 lies in a horizontal plane prime mover 400 may minimize shear stress on tower 404 and thus allows a user to place prime mover 400 at the top of tower 404 thus placing prime mover 400 in a position to take advantage of higher wind speeds with less turbulence. Of course, the prime mover 400 may be placed at different positions within the tower as desired to access higher wind speeds and lower turbulence.

As shown in FIG. 8, a generator 408 may be placed lower or on the ground proximate to tower 404 and may be coupled to prime mover 400 by a shaft 412. As prime mover 400 is powered by wind, shaft 412 will rotate and generator 408 will generate electricity. The electricity may then be delivered to a power grid or stored for use at a later time in an energy storage area, such as to power grid 416 shown in FIG. 8, for example. Alternatively, the electricity may be consumed immediately by a device. By having such a configuration, generator 408 may be proximate to the ground allowing for easier maintenance. Furthermore a larger generator may be used because the weight of generator 408 is no longer placed on the tower. Such a configuration may also provide power for the electrical components of the tower 404 so that the tower 404 need not necessarily be connected to the power grid.

Because prime mover 400 lies in a horizontal plane, prime mover 400 may maintain a low profile and may be stackable, in that it may be stacked on top of additional prime movers or other devices. For example, as shown in FIG. 8, prime mover 400 is stacked on top of an airfoil 420. By stacking the prime movers, the blade assemblies for each prime mover may be oriented at different angles to smooth fluctuations in torque. Furthermore, the amount of power available may be increased.

Prime movers according to the invention may also be placed within flow guides. For example FIGS. 9A, 9B, 10A and 10B depict a prime mover placed in different flow guides. Implementation of these flow guides may help increase the velocity of a fluid toward the blade assemblies and may also help guide a fluid around obstacles to avoid turbulence.

Figure 9A:
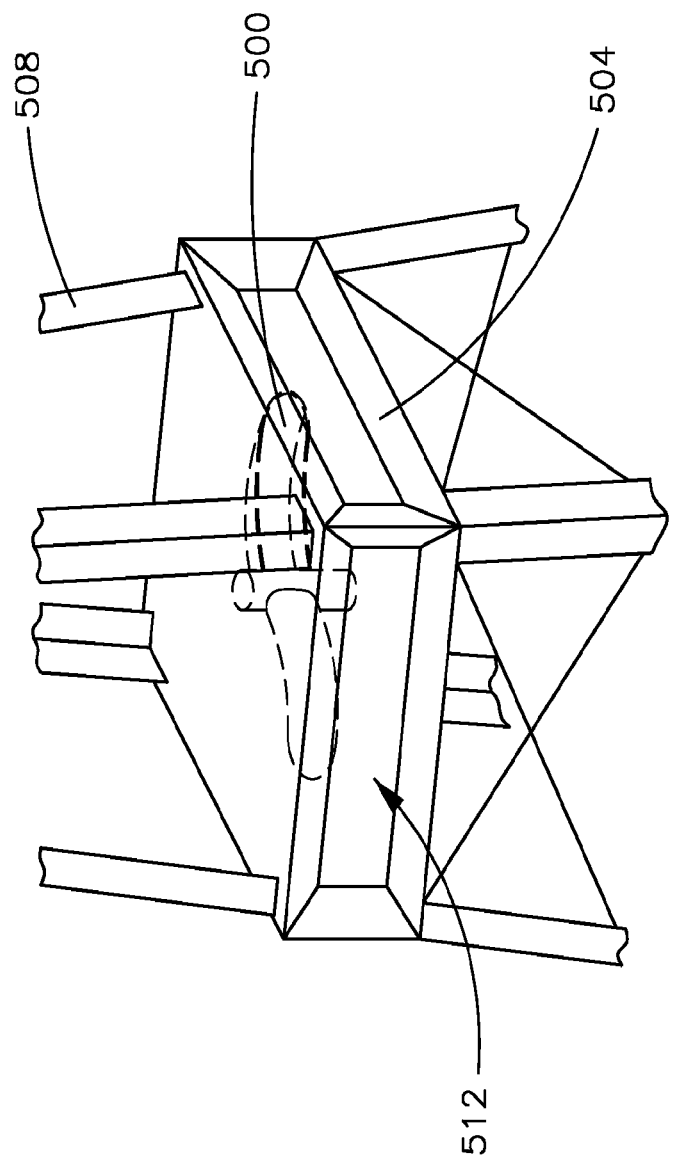
FIG. 9A is partial isometric view depicting a prime mover disposed within a flow guide.
Figure 9B:
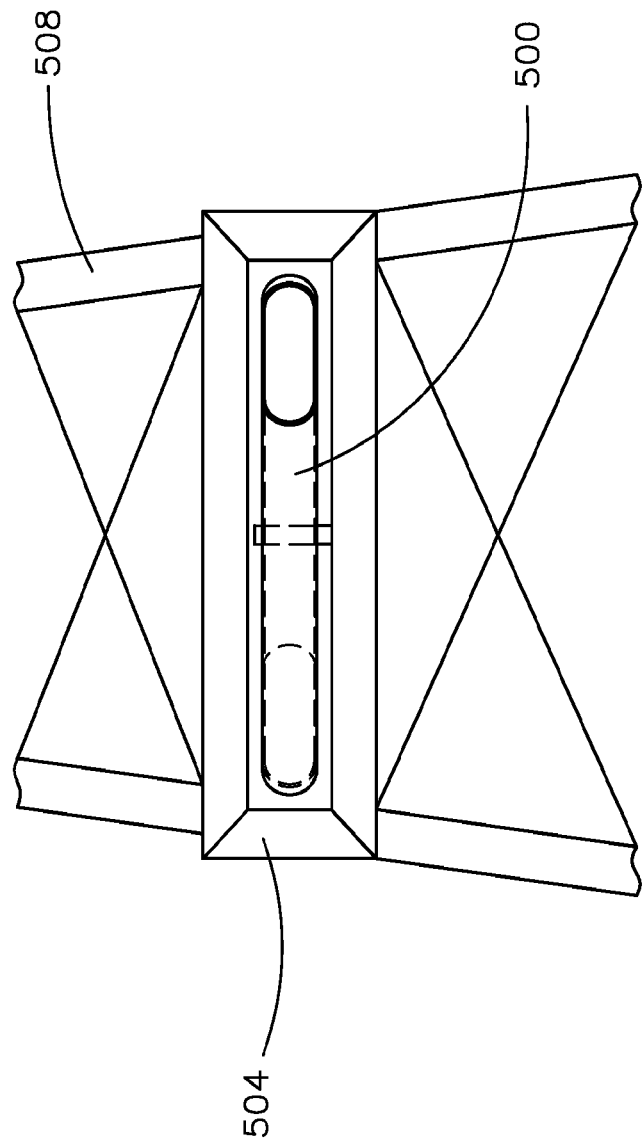
FIG. 9B is a side view of the prime mover and flow guide shown in FIG. 9A.

As shown in FIGS. 9A and 9B, a blade assembly 500 is placed within a flow guide 504. As shown, flow guide 504 is connected to a tower 508 and may be square shaped. Flow guide 504 is hollow and includes passageways 512 with inlets on each side of the square. Accordingly, a fluid may enter and be guided toward blade assembly 500 from any direction.

Figure 10B:
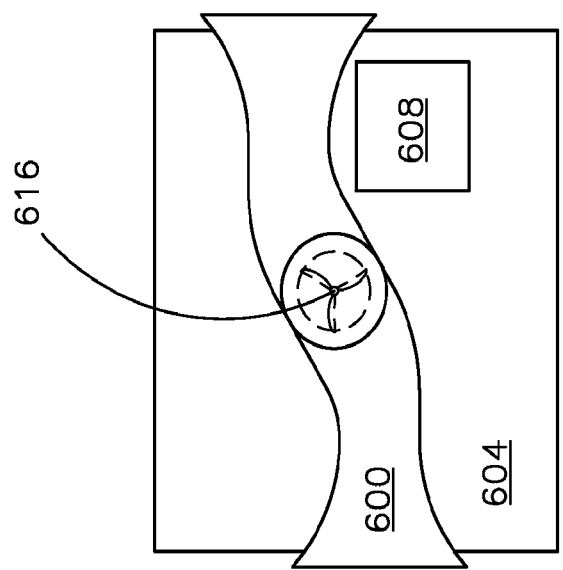
FIG. 10B is a schematic depicting a flow guide for guiding airflow around obstacles.

FIGS. 10A and 10B depict another flow guide placed on top of a building. By implementing flow guides on top of buildings, higher laminar airflow found just off the top edge of a building may be guided toward a prime mover, and may guide the air flow around obstacles before reaching the turbine. As shown, a flow guide 600 may be placed on top of a building 604. Flow guide 600 may guide wind around obstacles such as obstacle 608 and may guide laminar air flow 612 toward a prime mover 616. As shown, prime mover 616 may be placed within flow guide 600 and may help generate power using the power of wind.

Figure 11A:
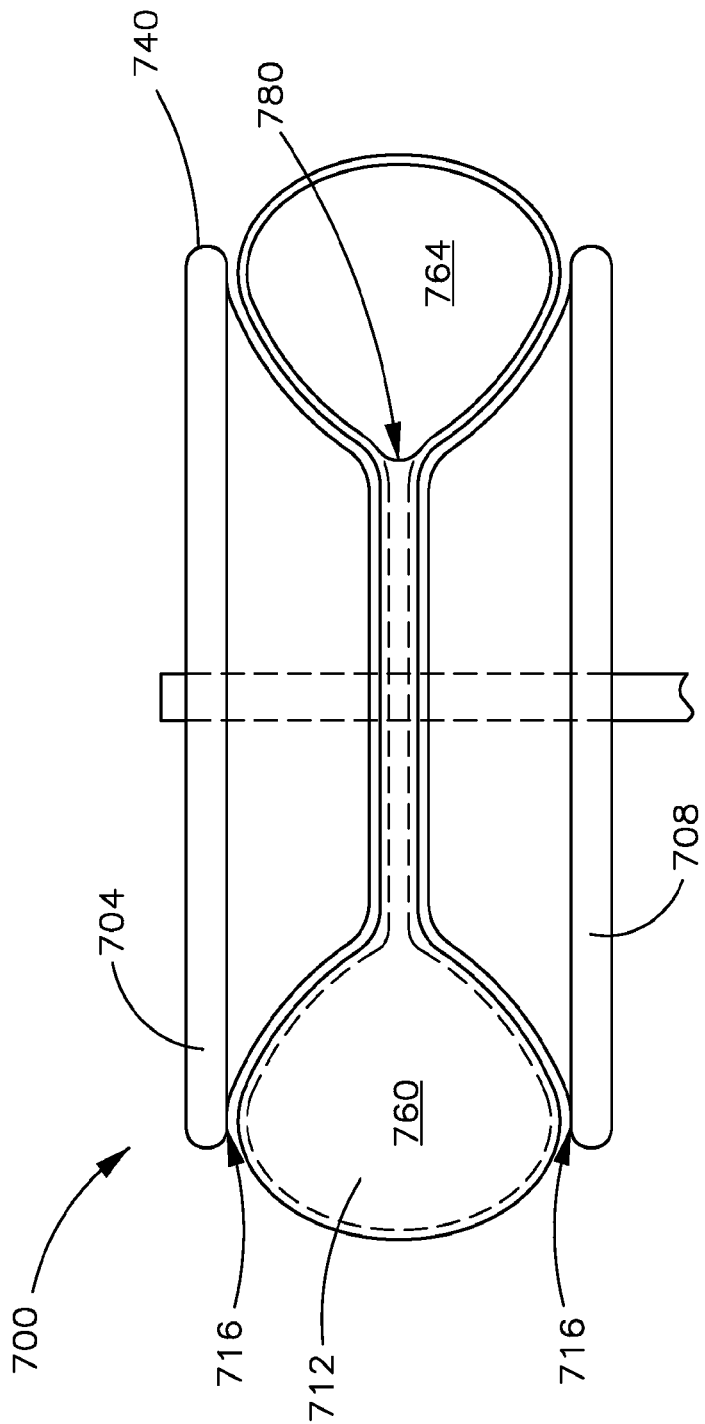
FIG. 11A is a side view of a prime mover and fairing implementation whereby the blade's fluid contact areas are disposed outside the fairings.
Figure 11B:
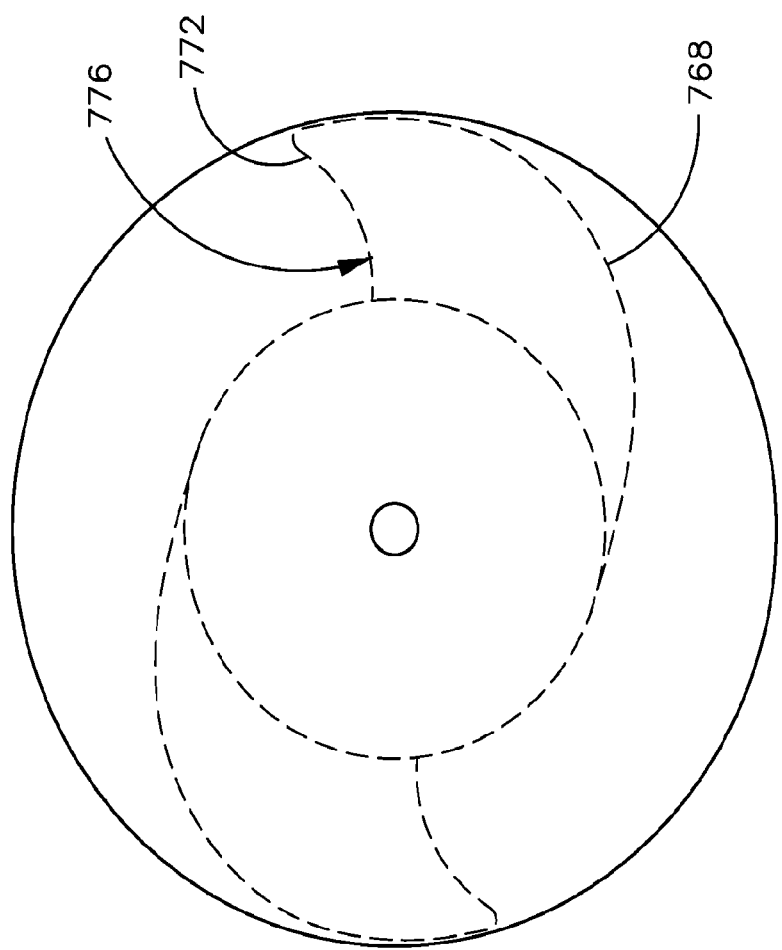
FIG. 11B is a top view of the assembly shown in FIG. 11A.

FIGS. 11A and 11B illustrate another prime mover. As shown, a prime mover 700 includes a first fairing 704 and a second fairing 708 placed closely together so that fluid flows laterally about the fairings 704 and 708 while blade assembly 712 can still rotate freely about its axis. As shown the first fairing 704 and second fairing 708 each has a peripheral surface 716 that extends over most of the blade assembly 712. In particular, an upper portion 740 of the surface 716 can extend beyond the blade assembly 712.

As shown, blade assembly 712 rotates about a vertical axis and includes a first blade 760 and a second blade 764. Each blade 760 and 764 includes a convex back face 768 and a concave front face 772 that defines a cavity 776. Front faces 772, back faces 768 and cavities 776 are similar to those described for blade assembly 70 and thus operate in a similar manner and provide the same advantages over conventional blades. Additionally blades 760 and 764 are hollow inside and provide an airflow path through 780.

The description of prime movers 10, 700, and their respective subsystems are for illustration purposes, and the present invention is not intended to the particular descriptions or uses provided herein, nor is the designation of parts into particular subsystems intended to limit the scope of the invention in any way, except for the particular structure that is explicitly recited in the claim. For example, prime movers 10 and 700 may also be used to generate heat power, circulate liquids, separate hydrogen from water to use or store for energy and other energy power usages.

What is claimed:

1. A prime mover powered by the energy of a fluid, the prime mover comprising: a first fairing; a second fairing spaced apart from the first fairing to define a gap therebetween, the first and second fairings each having a curved peripheral edge for guiding a fluid into the gap; a shaft extending in a substantially vertical direction between the first fairing and the second fairing, the shaft defining a vertical axis; and a blade assembly mounted on the shaft between the first and second fairings, wherein (i) a height of at least one of the fairings is at least 15% of the height of the gap, (ii) the peripheral edge of each fairing transitions into a substantially flat surface and the peripheral edge is connected to the flat surface to form a continuous surface throughout an area in which the blade assembly rotates, and (iii) the fluid flows into the gap and contacts the blade assembly to thereby rotate the blade assembly about the vertical axis.

2. The prime mover of claim 1, wherein the blade assembly comprises at least two blades.

3. The prime mover of claim 1, wherein the blade assembly comprises a first curved blade, the first curved blade has a front face and a back face, the front face is concave and the back face is convex, and the front face defines a cavity for catching the fluid.

4. The prime mover of claim 3, wherein the first curved blade is hollowed to make a passageway of equal or greater cross-sectional area and to allow airflow to a second curved blade to be exhausted from the second curved blade.

5. The prime mover of claim 3, wherein the back face has a curved shape that is adapted to guide the fluid.

6. The prime mover of claim 3, wherein the first curved blade further includes a tip that curves into the fluid.

7. The prime mover of claim 3, wherein the blade assembly further comprises an arm that extends from the shaft, and the first curved blade is attached to a distal end of the arm.

8. The prime mover of claim 7, wherein the arm is curved, and the curved arm includes a concave side and a convex side.

9. The prime mover of claim 1, wherein the blade assembly comprises a flywheel and a plurality of curved blades extending from a peripheral surface of the flywheel.

10. The prime mover of claim 1, wherein the blade assembly comprises a flywheel and plurality of curved blades incorporated within the flywheel.

11. The prime mover of claim 1, wherein the fluid is air.

12. The prime mover of claim 1, wherein the first fairing, the second fairing, and the blade assembly are connected together to rotate as a single unit about the vertical axis.

13. The prime mover of claim 1, wherein the first and second fairings are each circular in shape.

14. The prime mover of claim 13, wherein the first fairing has a first diameter, the second fairing has a second diameter, and the first diameter is smaller than the second diameter.

15. The prime mover of claim 1, wherein the peripheral edge of each fairing is parabolic, curving inward toward the gap defined between the two fairings.

16. The prime mover of claim 1, wherein a plurality of guide vanes are disposed on the peripheral edges of the first and second fairings.

17. The prime mover of claim 1, further comprising a flow guide, wherein the prime mover is placed inside the flow guide, and the flow guide guides the fluid towards the prime mover.

18. The prime mover of claim 1, wherein the height of at least one of the fairings is at least 20% of the height of the gap.

19. The prime mover of claim 1, wherein the height of at least one of the fairings is at least 30% of the height of the gap.

20. The prime mover of claim 1, wherein (i) the blade assembly has a contact area, (ii) a contact portion of the blade assembly contact area is radially outward from the fairings, and (iii) the fluid flows laterally around the fairings and contacts the contact portion of the blade assembly that is radially outward from the fairings to thereby rotate the blade assembly about the vertical axis.

21. The prime mover of claim 1, further comprising: a flow guide having a passageway with one entrance and one exit, wherein the prime mover is positioned within the passageway of the flow guide such that the fluid flows through the passageway of the flow guide and into the gap of the prime mover to thereby contact and rotate the blade assembly about the vertical axis.

22. The prime mover of claim 1, wherein the peripheral edge is circular.

23. A method for generating electricity from a prime mover that is mounted on a tower configured to transmit signals, the method comprising:

mounting a prime mover to a tower configured to transmit signals, the prime mover comprising a first fairing and a second fairing spaced apart from the first fairing, and a blade assembly disposed between the first and second fairings, the blade assembly being configured to rotate between the first and second fairings about a vertical axis, wherein (i) a height of at least one of the fairings is at least 15% of the height of the gap, (ii) the peripheral edge of each fairing transitions into a substantially flat surface and the peripheral edge is connected to the flat surface to form a continuous surface throughout an area of the blade assembly, and (iii) the fluid flows into the gap and contacts the blade assembly to thereby rotate the blade assembly about the vertical axis;

generating energy from the rotating blade assembly in a generator; and delivering the energy to a power grid, to a device, or to an energy storage area.

24. The method of claim 23, wherein the tower is a cell phone tower.

25. The method of claim 23, wherein the prime mover is mounted proximate to a top end of the tower.

26. The prime mover of claim 21, wherein the flow guide is mounted at the edge of a building so as to provide air flow of increased velocity off the edge of the building to the entirety of the gap of the prime mover.

27. The prime mover of claim 26, wherein the flow guide has a cross-sectional area that decreases towards an area in which the prime mover is placed such that the air flow velocity is increased to the entirety of the gap of the prime mover.

28. The prime mover of claim 26, wherein the flow guide guides air flow around obstacles on the building.

\* \* \* \* \*